United States Patent [19]

Hartwig

[11] Patent Number: 5,761,963
[45] Date of Patent: Jun. 9, 1998

[54] SPINDLE NUT/THREADED SPINDLE DEVICE

[75] Inventor: Heinen Hartwig, Bruchkoebel, Germany

[73] Assignee: Honeywell Inc., Minneapolis, Minn.

[21] Appl. No.: 717,375

[22] Filed: Sep. 20, 1996

[30] Foreign Application Priority Data

Sep. 21, 1995 [DE] Germany .................. 195 35 051.0

[51] Int. Cl.$^6$ ................................................ F16K 31/02
[52] U.S. Cl. ........................ 74/424.8 VA; 251/129.12
[58] Field of Search .............. 74/424.8 VA; 251/129.11, 251/129.12; 318/469; 192/141, 150

[56] References Cited

U.S. PATENT DOCUMENTS 4,546,281 10/1985 Gladisch et al. ............ 251/129.12 X
4,770,390 9/1988 Tratz et al. ..................... 251/129.11
5,291,919 3/1994 Calzavara ..................... 74/424.8 VA
5,345,835 9/1994 Schabert et al. ............... 74/424.8 VA Primary Examiner—Rodney H. Bonck
Assistant Examiner—Troy Grabow
Attorney, Agent, or Firm—Charles L. Rubow

[57] ABSTRACT

A device for converting the rotation of a spindle nut into a force-related linear translation of a threaded spindle in an electromechanical valve actuator, the spindle being formed with longitudinal grooves in which clamping hooks are located. Hooked ends of the clamping hooks engage retainer rings of which one retainer ring abuts a collar on the spindle nut or abuts a stationary abutment, respectively, and another retainer ring restrains one end of a spring, the other end of which is restrained by a stationary abutment or the collar.

8 Claims, 3 Drawing Sheets

SPINDLE NUT/THREADED SPINDLE DEVICE

BACKGROUND OF THE INVENTION

The present invention relates generally to rotary-to-translational motion conversion apparatus, and, more specifically, to a device for converting the rotation of a spindle nut into linear translation of a threaded spindle, the spindle nut being spring biased in both directions along the line of translation. Such a device is commonly used in an electromechanical valve actuator.

A known electromechanical valve actuator of this type comprises a synchronous electric motor, which, by means of an interposed gear train, drives a spindle nut, the internal thread of which cooperates with an external thread of a threaded spindle. The threaded spindle is coupled to a valve stem which moves a closure member of the valve relative to a corresponding valve seat. In a three-way valve, the closure member acts together with two valve seats. In order to produce a predetermined closing force of the valve, the spindle nut is axially displaceable within a bearing race whose position is fixed along the line of translation. A spring, preferably a cup spring, provides biasing between the bearing race which forms a stationary abutment and an opposing abutment on the spindle nut. At the limiting position at each valve seat, the spindle nut experiences an axial displacement and compresses the spring biasing mechanism until a limit switch cuts off power to the synchronous motor. Accordingly, the valve is closed and the closure member abuts the valve seat with a predetermined closing force.

The conventional arrangement of two springs for providing bi-directional biasing in this known design has certain disadvantages. The resulting problems become more pronounced when the spindle nut is made of synthetic resin. Typically, retainer rings in circumferential grooves in the spindle nut serve as abutments for cup spring packages. Continually present biasing forces of the cup springs and the additional force introduced at the limits of travel of the spindle nut require strength and resistance to creep which practically can be met only by making the spindle nut from bronze or another suitable metal.

Departing from this prior art, it is therefore the object of the present invention to design a device of the above-indicated type in such a way that it becomes simpler, cheaper and requires less strength and creep resistance so that the spindle nut can be made of synthetic resin.

SUMMARY OF THE INVENTION

The invention is a rotary-to-translational motion conversion device in which a single bias spring provides bi-directional biasing of a spindle nut along the line of translation, a system of retainer washers and interconnecting linkage alternatively engaging opposite ends of the spring depending on the direction of force to which the spindle nut is subjected. A stationary abutment surrounds the spindle nut which is provided with a collar in the area within the stationary abutment. A spring surrounding the spindle nut is located between the collar and a first retainer, the first retainer being linked to a second retainer surrounding the spindle nut on the opposite side of the stationary abutment by means of a plurality of clamping hooks located in axial grooves in the spindle nut.

DESCRIPTION OF THE PREFERRED EMBODIMENT

Figure 1:
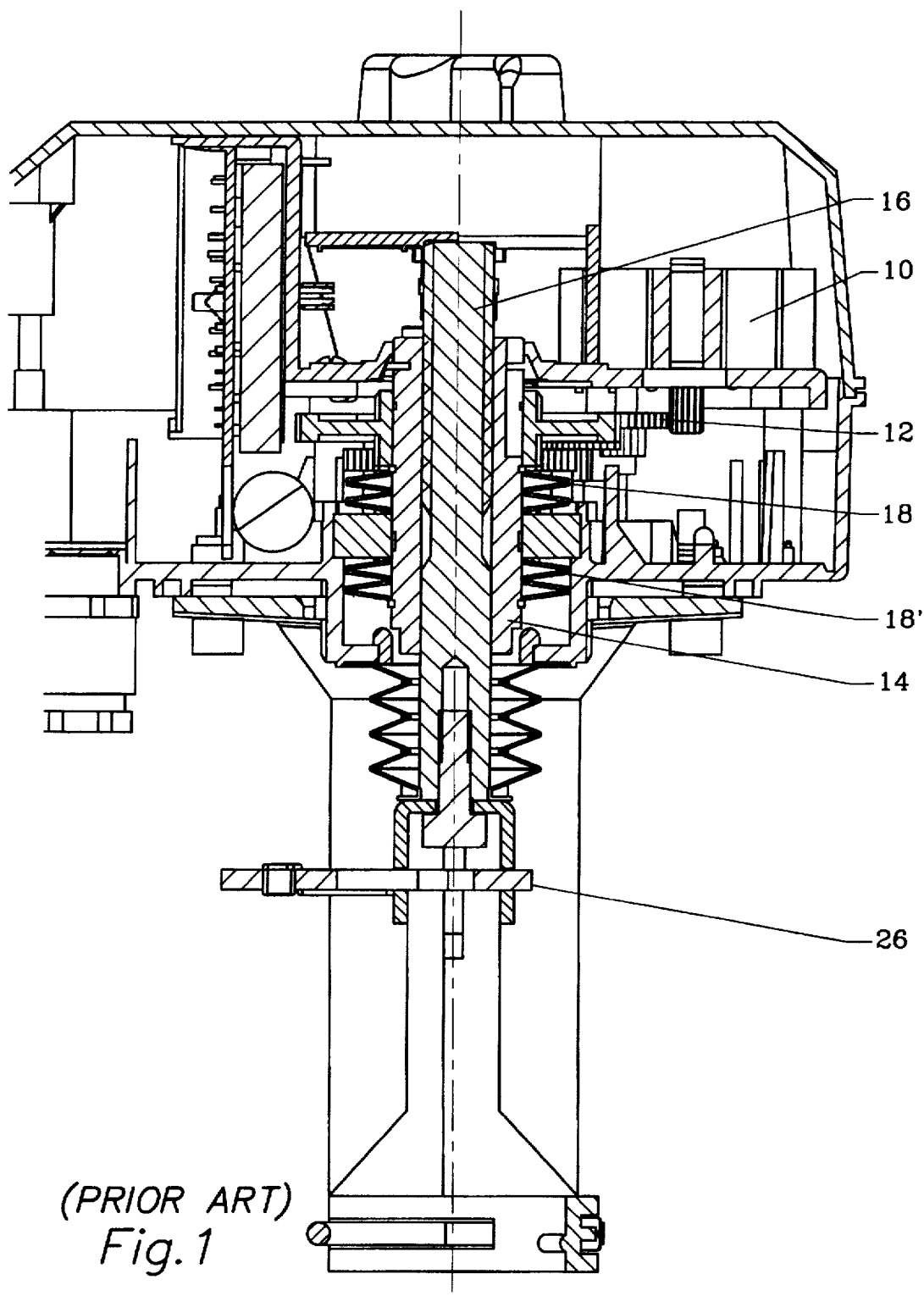
FIG. 1 is a sectional view of a prior art electromechanical valve actuator.
Figure 1A:
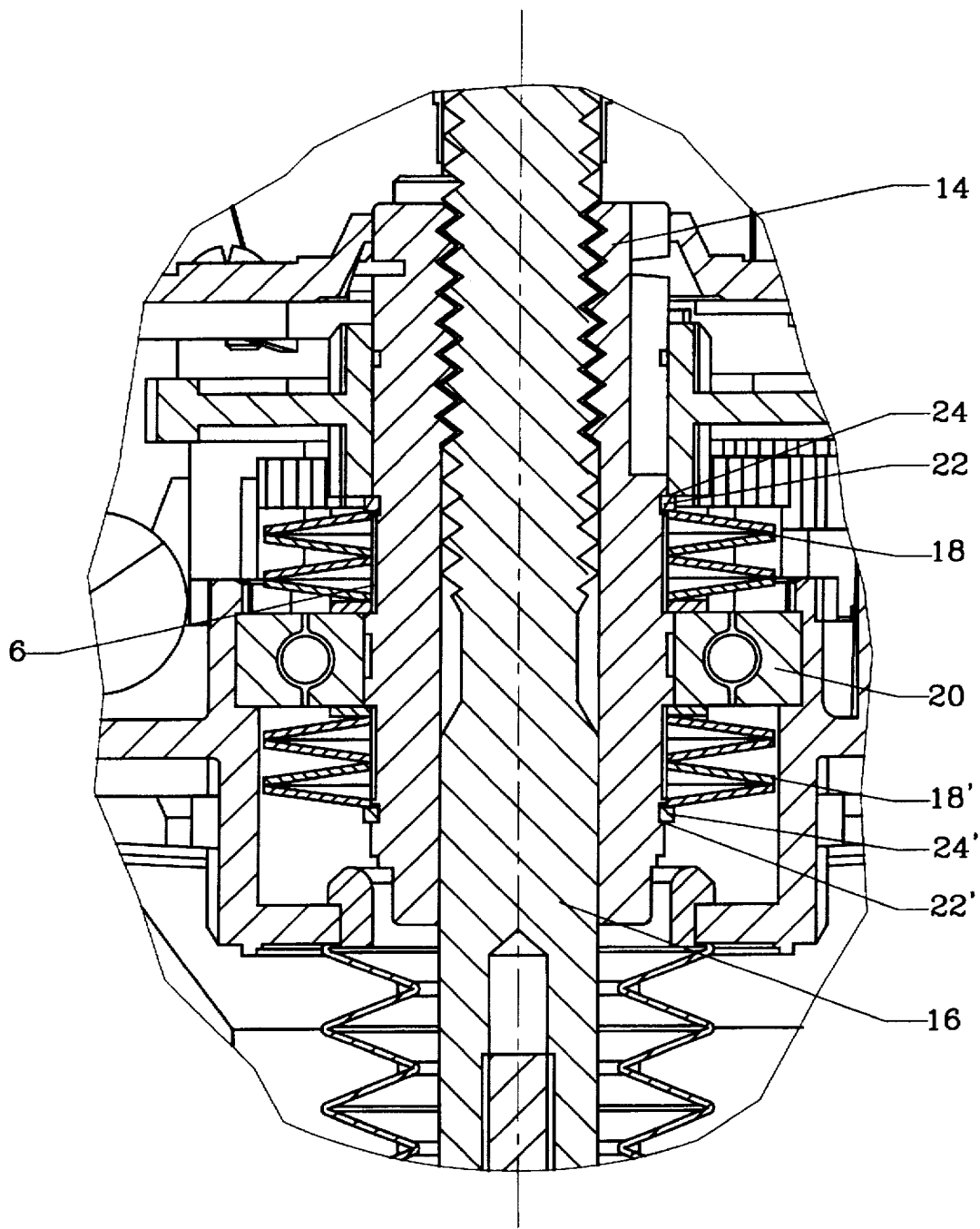
FIG. 1A is an enlarged view of a portion of the actuator shown in FIG. 1.

According to FIGS. 1 and 1A, the prior art valve actuator comprises a stationary mounted synchronous motor 10, which by means of an interposed gear train 12 drives a spindle nut 14, the internal thread of which is engaged by an external thread of a threaded spindle 16 so that, upon rotation of spindle nut 14, threaded spindle 16 is displaced along its central longitudinal axis. Spindle nut 14 is biased in opposite directions by means of cup spring packages 18, 18' against the inner race 20 of a ball bearing fixed in a housing. Retainer rings 24, 24' are positioned in circumferential grooves 22, 22' to provide a movable counter abutment for the cup spring packages. Threaded spindle 16 may be coupled to a valve stem (not shown) by means of a coupling 26. In operation, when a closure member connected to the valve stem abuts a valve seat, the valve stem and the threaded spindle connected to it is prevented from a further axial movement and spindle nut 14 is accordingly displaced against the force of one of the cup spring packages. As a result, one of cup spring packages 18, 18' is compressed until a limit switch actuated by spindle nut 14 cuts off power to synchronous motor 10.

Figure 2:
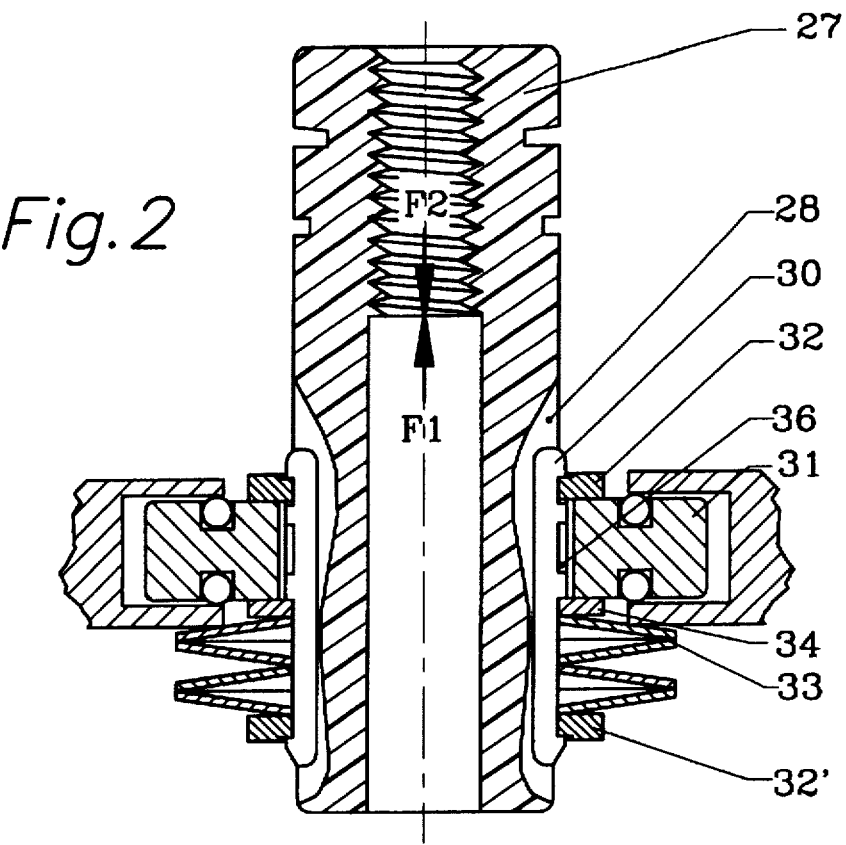
FIG. 2 is a sectional view of an improved spindle nut and spring biasing arrangement for an actuator similar to that shown in FIG. 1, in accordance with the Applicant's invention.
Figure 3:
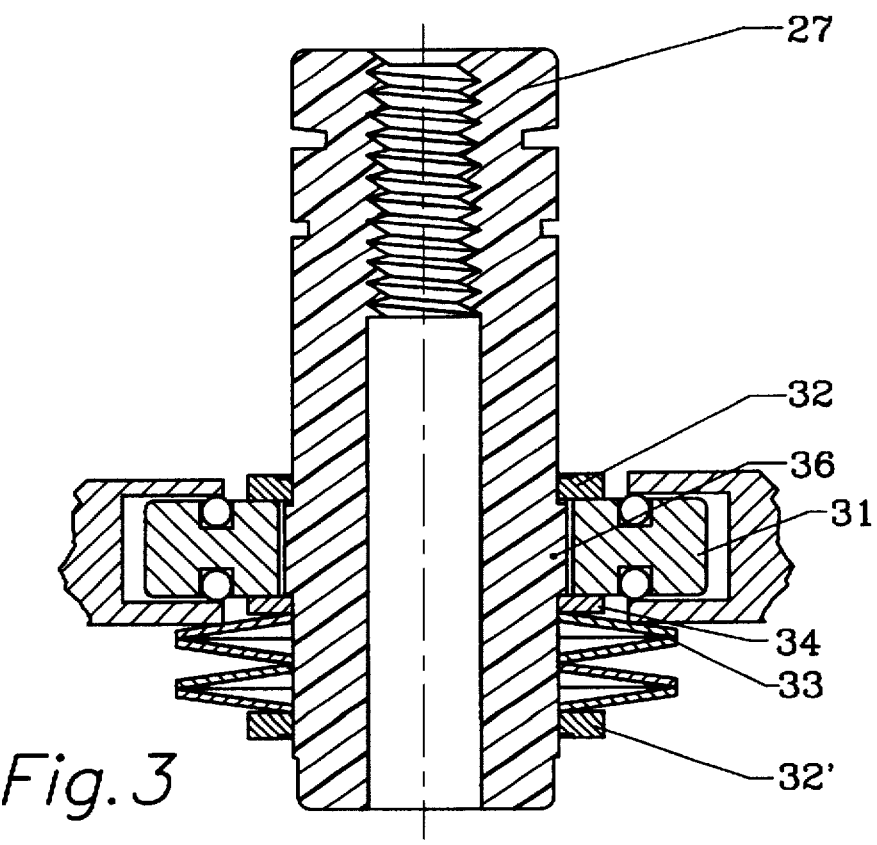
FIG. 3 is a sectional view of the apparatus of FIG. 2 in which the plane of the section has been rotated about the vertical axis shown in FIG. 2.

According to the improved mechanization of FIG. 2, a spindle nut 27 is formed with longitudinal grooves 28, in which clamping hooks 30 are located. Preferably four equally spaced sets of grooves 28 and clamping hooks 30 are provided around the perimeter of spindle nut 27, spaced from one another by 90°. Grooves 28 are longer than clamping hooks 30, and clamping hooks 30 are axially displaceable within the spaces between the bottoms of the grooves and a ball-bearing race 31 surrounding spindle nut 27, the position of race 31 along the longitudinal axis of the spindle being fixed. The ends of the grooves 28 are deepened in order to allow deflection of clamping hooks 30, which are preferably made from spring steel, so that retainer rings 32, 32' surrounding spindle nut 27 may be slipped over the hook-shaped ends of the clamping hooks after a cup spring package 33 has already been slipped over the lower ends of the clamping hooks. A thrust washer 34 surrounds spindle nut 27 at an axial location between retainer rings 32 and 32'. Within the inner perimeter of ball bearing race 31 and between grooves 28, spindle nut 27 is formed with a circumferential collar 36. Collar 36 has, at its upper shoulder, retainer ring 32 and at its lower shoulder, thrust washer 34. Retainer ring 32' and thrust washer 34 form opposing abutments for cup spring package 33.

The structure described above operates as follows:

With a force applied along arrow $F_1$ in FIG. 2, collar 36 of spindle nut 27 tends to displace retainer ring 32 upwardly. Upward displacement of ring 32 is transferred by means of clamping hooks 30 to opposite retainer ring 32' which transfers the displacement to the lower end of cup spring package 33. Ball-bearing race 31, through thrust washer 34, forms an axially fixed counter abutment for the cup spring package. Upward displacement of spindle nut 27 accordingly, compresses cup spring package 33 until the limit switch (not shown) cuts off power to the synchronous motor.

With a force applied along the arrow $F_2$, collar 36 of spindle nut 27 tends to displace thrust washer 34 downwardly. This displacement is transferred to the upper end of cup spring package 33. Retainer ring 32' and the lower end of the cup spring package are kept stationary via clamping hooks 30 and retainer ring 32, whose downward movement is prevented by ball-bearing race 31. Thus, downward displacement of spindle nut 27 also compresses cup spring package 33 until the limit switch (not shown) cuts off power to the motor.

In accordance with the foregoing description, the Applicant's design provides various advantages. Specifically, the biasing forces produced by the cup spring package are carried by the clamping hooks. This eliminates sustained force loading on the, spindle nut during the normal operation. Further, circumferential grooves in the spindle nut for retainer rings may be omitted so that high stress areas are substantially reduced. Also, within the total range of movement of the spindle nut, no added force results with respect to applied forces $F_1$ or $F_2$, respectively. Furthermore, the clamping hooks avoid friction between the cup spring package and the spindle nut. These features all contribute to a design in which spindle nut 27 can be made of synthetic resin without problem.

The embodiments of an invention in which an exclusive property or right is claimed are defined as follows:

1. In a device for converting rotation of a spindle nut into a force-related linear translation of a threaded spindle, the spindle nut at its limiting position in each of opposite directions exerting a displacement force against a spring which spring is compressed between a stationary and a displaceable abutment, the improvement which comprises:

a spindle nut having a plurality of longitudinal grooves spaced around its circumference;

a spring;

a plurality of clamping hooks respectively located in said plurality of longitudinal groves; and engagement means linking said spring and said clamping hooks so that opposite ends of said spring are alternatively displaced depending on the direction of force exerted by said spindle nut.

2. The device of claim 1 wherein the plurality of grooves and clamping hooks are equally spaced around the perimeter of said spindle nut.

3. The device of claim 2 wherein:

said clamping hooks are provided with hook ends which engage retainer rings in said engagement means;

said spindle nut is provided with a collar of enlarged diameter;

said spring is arranged between one of said retainer rings and said collar, another of said retainer rings being alternatively secured between said collar and said clamping hooks, or between said clamping hooks and said stationary abutment.

4. The device of claim 3 further including a shim between said collar and said spring.

5. The device of claim 1 wherein:

said clamping hooks are made from spring steel; and said grooves are deepened at their ends, and within their middle ranges are formed as a support for guiding said clamping hooks.

6. The device of claim 3 wherein said stationary abutment is provided by means of a ball-bearing race fixed to a housing, within which said spindle nut is axially displaceable.

7. The device of claim 5 wherein said spindle nut is made of synthetic resin.

8. The device of claim 5 wherein the longitudinal extension of said grooves is larger than the length of said clamping hooks.

* * * * *

UNITED STATES PATENT AND TRADEMARK OFFICE
CERTIFICATE OF CORRECTION

PATENT NO. : 5,761,963
DATED : June 9, 1998
INVENTOR(S) : Hartwig Heinen

It is certified that error appears in the above-identified patent and that said Letters Patent is hereby corrected as shown below:

On the title page, change the inventor's name from "Heinen Hartwig" to read --Hartwig Heinen--.

UNITED STATES PATENT AND TRADEMARK OFFICE
CERTIFICATE OF CORRECTION

PATENT NO.   : 5,761,963
DATED        : June 9, 1998
INVENTOR(S)  : Hartwig Heinen It is certified that error appears in the above-identified patent and that said Letters Patent is hereby corrected as shown below:

On the title page, insert the following:

U. S. PATENT DOCUMENTS

| EXAMINER INITIAL | | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|---|
| | | 5 | 2 | 9 | 1 | 9 | 1 | 9 | 03/1994 | CALZAVARA | | | |
| | | 4 | 7 | 7 | 0 | 3 | 9 | 0 | 09/1988 | TRATZ ET AL | | | |
| | | 4 | 5 | 4 | 6 | 2 | 8 | 1 | 10/1985 | GLADISCH ET AL | | | |
| | | 5 | 3 | 4 | 5 | 8 | 3 | 5 | 09/1994 | SCHABERT ET AL | | | |

FOREIGN PATENT OR PUBLISHED FOREIGN PATENT APPLICATION

| | | DOCUMENT NUMBER | | | | | | | PUBLICATION DATE | COUNTRY OR PATENT OFFICE | CLASS | SUBCLASS | TRANSLATION | |
|---|---|---|---|---|---|---|---|---|---|---|---|---|---|---|
| | | | | | | | | | | | | | YES | NO |
| | | 0 | 0 | 1 | 0 | 1 | 1 | 3 | 11/21/78 | EPO | | | | |
| | | 3 | 1 | 3 | 4 | 8 | 2 | 0 | 09/03/81 | GERMANY | | | | |
| | | 9 | 4 | 1 | 5 | 5 | 6 | 6 | 09/16/84 | GERMANY | | | | |

Signed and Sealed this

Twelfth Day of January, 1999

Attest:

Attesting Officer

*Acting Commissioner of Patents and Trademarks*